United States Patent
Krone et al.

[15] 3,705,408
[45] Dec. 5, 1972

[54] FLEXIBLE SLIDING ADAPTER FOR FACSIMILE RECEIVER STYLUS POSITIONING

[72] Inventors: Ben W. Krone, 2405 John Drive, Urbana, Ill. 61801; Kenton D. Royer, 907 Meadowview, Tuscola, Ill. 61953

[22] Filed: April 15, 1971

[21] Appl. No.: 134,345

[52] U.S. Cl. ............................................. 346/139 C
[51] Int. Cl. ............................................. G01d 15/00
[58] Field of Search ...... 346/139 C, 139 R, 141, 104, 346/105, 106; 178/6.6 R, 14

[56] References Cited

UNITED STATES PATENTS

| | | |
|---|---|---|
| 813,005 | 2/1906 | Hult ..................................... 346/137 |
| 3,325,821 | 6/1967 | Reese et al. .......................... 346/104 |

*Primary Examiner*—Joseph W. Hartary
*Attorney*—Woodard, Weikart, Emhardt & Naughton

[57] ABSTRACT

A flexible skid is mounted between pressure-sensitive copy paper, and a follower roller of a transducer holding the paper marking stylus. The skid, held in place by a plate retained on the transducer housing by the magnetic field and pressure-sensitive adhesive, slides on the paper as the transducer traverses the paper and, while providing the compliance needed for proper stylus functioning, remains comparatively free of dirt accumulation.

15 Claims, 10 Drawing Figures

PATENTED DEC 5 1972

3,705,408

INVENTORS
BEN W. KRONE
KENTON D. ROYER
BY
Woodard, Weikart, Emhardt & Naughton
ATTORNEYS

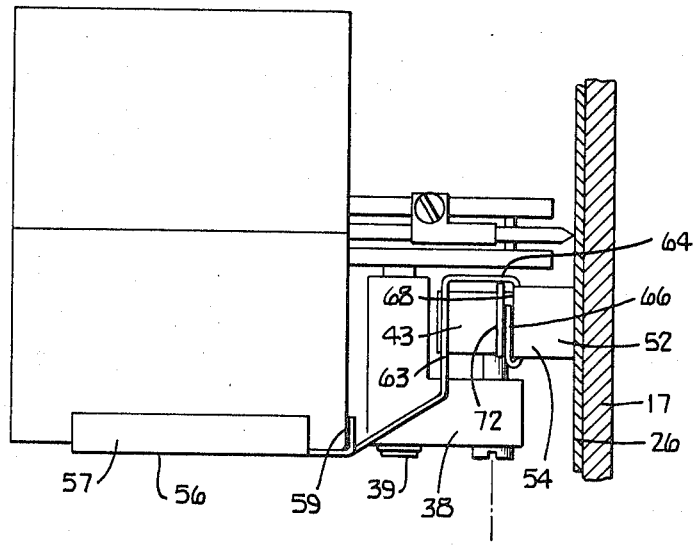
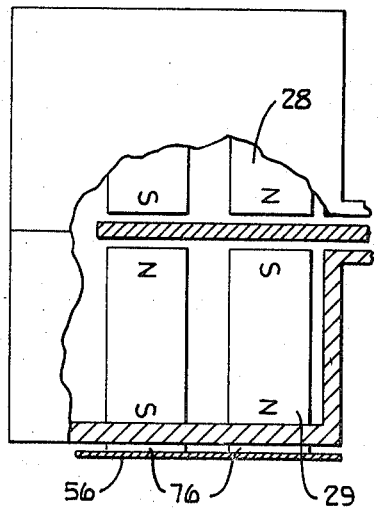
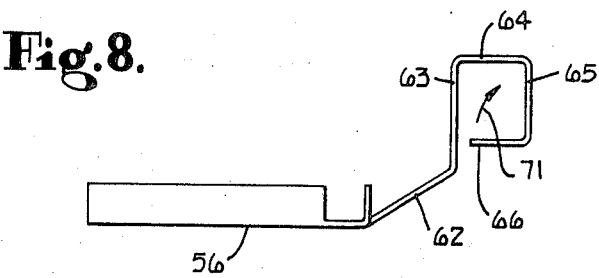
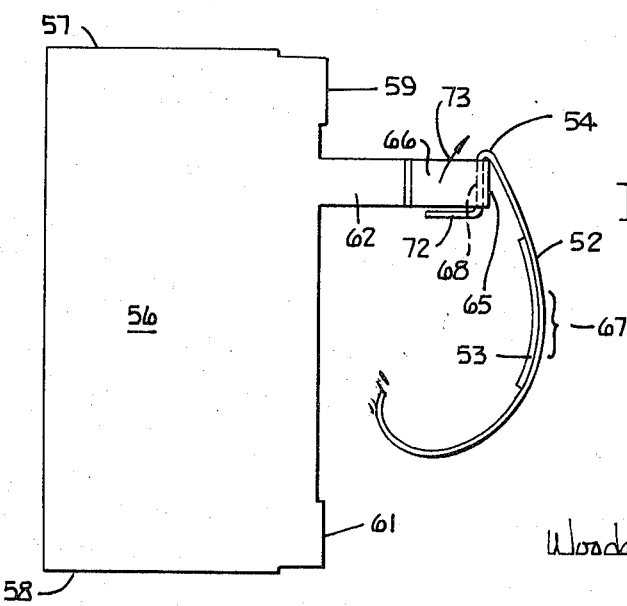

FLEXIBLE SLIDING ADAPTER FOR FACSIMILE RECEIVER STYLUS POSITIONING

BACKGROUND OF THE INVENTION

1. Field of the Invention

This invention relates generally to facsimile receivers, and more particularly to means for location and control of the paper marking stylus therein.

2. Description of the Prior Art

One type of equipment for facsimile transmission and reception is the "Magnafax 850" equipment marketed by Magnavox Systems, Inc., of Urbana, Illinois 61801. In this equipment there is a comparatively fragile component known as a "paper press," which serves as a control for an original document being optically scanned during a facsimile transmission operation. There is also a follower roller intended to control a paper marking stylus in a transducer assembly which is used for a receiving function in the same equipment. While the paper press is not needed for the receiving function, the follower roller does roll on it because of the relative position of the parts. After some period of considerable useage of the equipment for the receiving function, there are some accumulations of dirt which can interfere with functioning of the roller and with the functioning of the paper press. The present invention is directed toward minimizing generation of dirt and minimizing the effect of any accumulation of dirt, while at the same time facilitating field modification of existing equipment as well as being capable of utilization on original equipment in the factory, at a very reasonable cost.

SUMMARY OF THE INVENTION

Described briefly, in a typical embodiment of the present invention, a very flexible skid is positioned around a stylus locating roller to space the roller from the carbon paper or pressure-sensitive paper contacted by the stylus. The leading end of the skid is held in place by a bracket retained on the transducer housing by a combination of the magnetic attraction of a magnet therein, and also by pressure-sensitive adhesive secured to the housing and to the plate. The skid is of a shape accomodating normal forward movement, but also permitting some reversed movement without damage.

BRIEF DESCRIPTION OF THE DRAWINGS

FIG. 7 is a section taken at lines 7—7 in FIG. 6 and viewed in the direction of the arrows.

FIG. 8 is a fragment of the view of FIG. 7, but with a portion of the housing broken away at the lines 8—8 in FIG. 6 to show the operation of the magnetic field on the skid mounting plate.

FIG. 9 is a view of the skid mounting plate from the same position as shown in FIG. 7, but prior to fastening the skid thereto.

FIG. 10 is a view of the skid and mounting plate viewed in the same direction as in FIG. 6 but prior to completion of attachment of the skid to the plate.

DESCRIPTION OF THE PREFERRED EMBODIMENT

Figure 1:
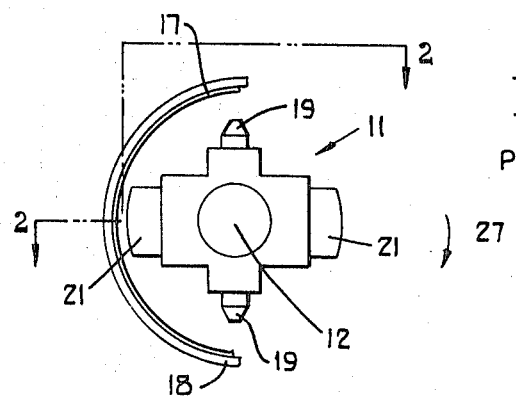
FIG. 1 is a diagramatic view along the axis of a facsimile machine yoke, showing a pair of scanning lenses, a pair of transducers, and a document holding platen.
Figure 4:
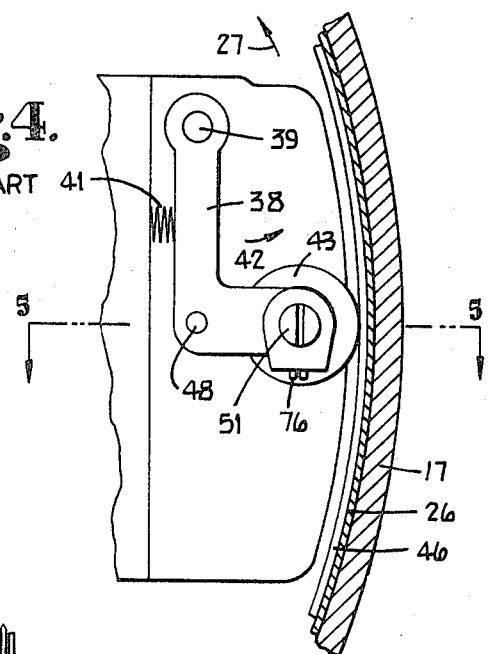
FIG. 4 is a view on the same scale as FIG. 3 showing a fragment of the transducer assembly looking in the direction of the arrows 4—4 in FIG. 2.

Referring now to FIG. 1, there is shown a diagramatic axial end view of a yoke assembly 11 mounted for rotation about a longitudinal axis 12 (FIG. 2) by the combination of a synchronous motor 13 and reduction gear assembly 14 driving a shaft 16. A platen 17 (the upper portion of which is omitted in FIG. 2) in the form of a cylindrical shell is mounted in a door pivotable downwardly about an axis 18 parallel to the axis 12, for facilitating insertion and removal of a document to be transmitted, or received. Two scanning lenses are provided at 19, and two transducer assemblies are provided at 21.

Figure 2:
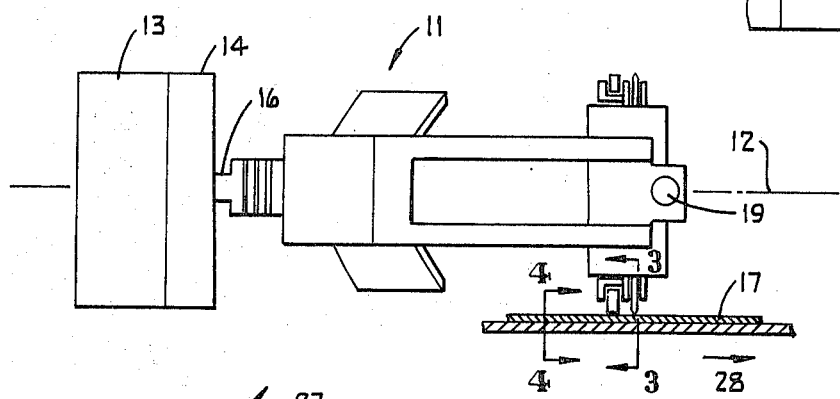
FIG. 2 is a slightly more elaborate view of the arrangement of FIG. 1 looking in the direction of the arrows 2—2 in FIG. 1.
Figure 3:
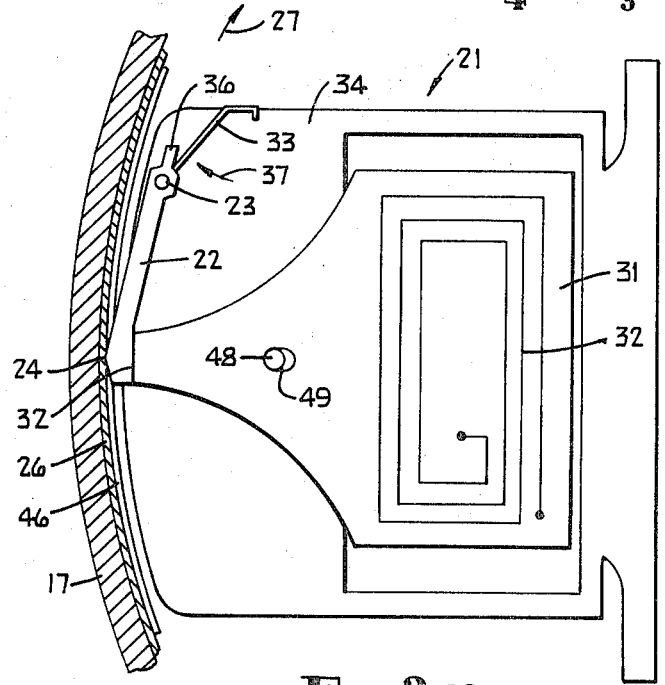
FIG. 3 is a much enlarged section through a transducer assembly, the section being taken at line 3—3 in FIG. 2 and viewed in the direction of the arrows and showing a stylus and "coil card."

As shown somewhat schematically in FIG. 3, transducer assembly 21 includes a stylus 22 pivotally mounted thereto on a pin 23. The crown 24 of the stylus engages the concave face of a sheet 26 of pressure-sensitive paper. A black mark can be produced on such paper by forceable engagement of the stylus against it, and it should be understood that a combination of carbon paper and conventional paper might also be used. Accordingly, as the yoke assembly is driven clockwise in the direction of arrow 27 (FIGS. 1 and 3) about its rotational axis 12, a document mounted in the platen can be scanned by the optical lenses for a transmission of the information on the document or, in the receive mode, information can be marked on paper disposed against the platen by the stylus of each of the two transducer assemblies as it traverses the paper. Traverse of the paper by the rotating transducer provides the horizontal lines on the finished document, and linear motion of the paper in the direction of arrow 28 in FIG. 2 provides the succession of lines on the paper. All of this is known in the art and some of it is described to some extent in U.S. Pat. No. 3,548,096 issued Dec. 15, 1970 and owned by the assignee of the present invention.

Figure 5:
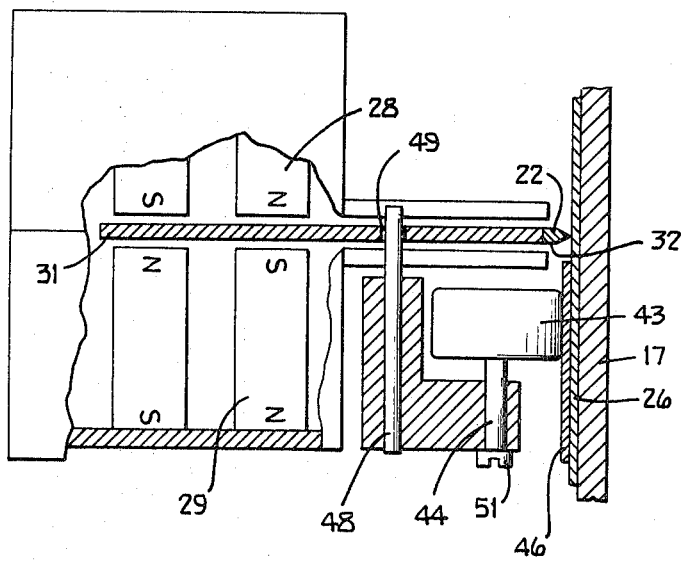
FIG. 5 is a section taken at line 5—5 in FIG. 4 and viewed in the direction of the arrows.

As suggested above, the pressure of the stylus against carbon paper or pressure-sensitive paper 26 produces marks or lines corresponding to dark areas of the transmitted document. As shown in FIG. 5, each transducer assembly contains a pair of permanent magnets 28 and 29 having a fixed gap between them. A printed circuit card 31 composed of two printed coil circuits placed on each side of a card, (shown schematically at 32 in FIG. 3) is held at the center of the magnets. The printed circuit coil card is free to move in the magnetic field, and moves in proportion to the current passed through it. The portion of stylus 22 behind the crown 24 is in abutting engagement with the end 32 of the coil card. It is urged against the coil card end 32 by means of a spring 33 mounted to the transducer housing portion 34 and having its free end engaging the stylus behind the arm 36 thereof, the spring urging this portion of the stylus in the direction of arrow 37 (FIG. 3). When input to the coil card changes, the stylus is driven against the medium being marked (copy paper in this example) in proportion to the input current. Thus, a grey mark on the original document will produce less voltage in a sending unit than a black mark on the original document, and the corresponding mark on the received copy will be grey. The relaxed or non-printing position of the stylus and card system is produced by the return force imparted to the stylus and card by the paper and the spring 33.

A further detail of the construction of the equipment prior to incorporation of the present invention thereon, is a follower arm 38 pivotally mounted to the transducer housing for pivotal action about the pin 39 and biased by suitable spring means illustrated schematically at 41 to urge the arm about the axis of pin 39 in the direction of arrow 42. Follower arm 38 has a roller 43 mounted thereto for rotation about an axle 44. This roller rides against the paper press 46, as the transducer traverses the paper in the direction of arrow 27. A pin 48 on the follower arm extends through an opening 49 in the coil card (FIGS. 3 and 5) and thereby positions the card and stylus correctly with respect to the paper as determined by engagement of the roller with the paper press, the latter being engaged with the paper. It can be observed in FIGS. 3 and 5 that the aperture 49 in the coil card is slightly elongated in the direction from the stylus crown toward the rotational axis 12. Therefore, while an eccentric mounting screw 51 for the roller axle 44 is adjusted so that the point of the stylus does not quite mark the copy paper when a "white" signal is received by the coil card, any other signal will drive the stylus outward with respect to the magnets and pin 48 to mark the paper. The total possible excursion permitted due to the elongated nature of the aperture 49 in the coil card may be approximately 0.010 inch, for example. Nevertheless, because the paper press is a thin member, and because the follower arm and thereby the roller is spring loaded, it automatically accommodates different paper thicknesses as well as contour variations of the platen as the yoke rotates and the transducer traverses the paper.

It can occur where pressure-sensitive paper is used, and particularly where carbon paper is used, that carbon particles can accumulate on parts. Also there can be some accumulation of paper dust, as well as dust and foreign material in general. In the existing equipment prior to the present invention, it was necessary to clean the roller 43 and paper press 46 periodically as dirt accumulation occurred. Copy quality degradation can occur as carbon dirt accumulates on the paper press and follower arm rollers. When cleaning becomes necessary, damage can occur to the paper press because of its comparatively fragile nature. The present invention overcomes the problem of accumulation of dirt on the roller and paper press by means shown in FIGS. 6 through 10.

Figure 6:
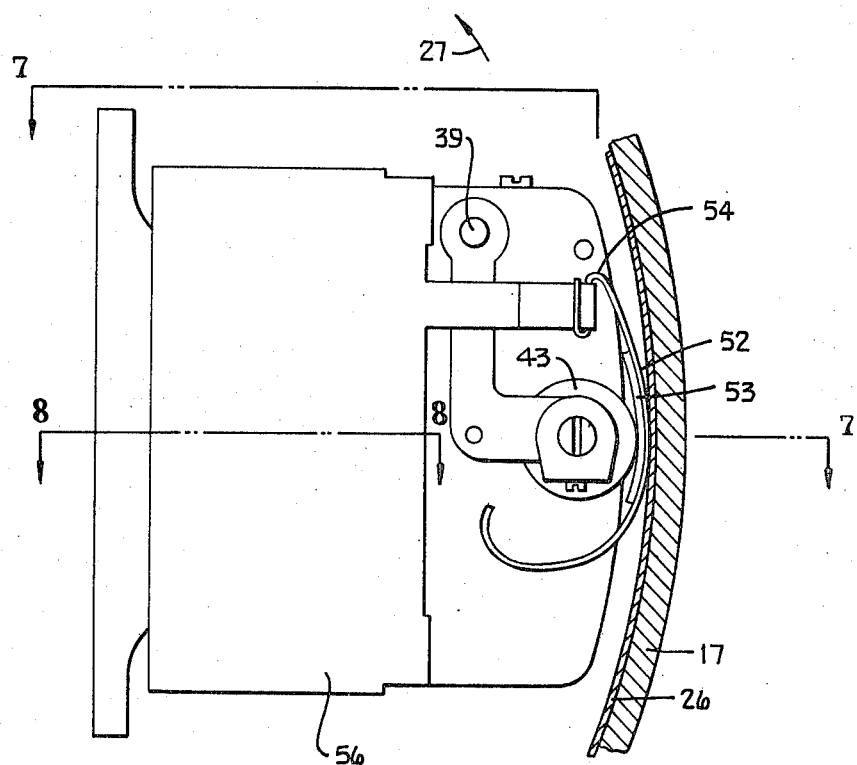
FIG. 6 is a view similar to FIG. 4 but showing a complete transducer assembly with the present invention incorporated thereon.

Referring particularly to FIG. 6, wherein everything is the same as previously described, insofar as construction of the transducer assembly and follower arm roller are concerned, it should be noted that the paper press is absent. Instead there is a skid 52 which is generally curvilinear in shape with the various radii of its curvature being centered on various axes parallel to the rotational axis 12 of the yoke. The skid has a strip of tape 53 secured to the concave face thereof. This combination is disposed between the roller 43 and the paper 26. The leading end portion 54 of the skid is clamped to the arm of a bracket unit having a mounting plate portion 56 secured to the transducer housing. Therefore, as the transducer traverses the paper in the direction of arrow 27 (the normal rotational direction of the yoke assembly) the skid 52 slides along the surface of the paper 26. The reason this is successful may be better understood by referring to FIGS. 9 and 10 and a more detailed description of the nature of the parts involved.

The skid mounting plate of FIG. 9 is typically formed of a ferromagnetic material, such as cold rolled steel which is then cadmium plated. As suggested in FIGS. 9 and 10, the central plate portion 46 thereof is flat, having an inner face which, when mounted to the transducer housing face, defines a mounting plate perpendicular to rotational axis 12. Inwardly turned tabs are provided at 57, 58, 59 and 61. There is also an inwardly turned arm portion 62 with a loop thereon 64, 65 and 66. A thickness of 0.020 inches is quite satisfactory for the material of the mounting plate.

The skid (FIG. 10) may typically employ a strip of brass shim stock about 0.250 inches wide and 0.005 inches thick. It is preferably chrome plated through approximately 0.250 inches along its length at 67 (FIG. 10) which slides on the paper, and the tape employed at 53 may be an electrical insulating tape of a polyester film type, or a "Teflon" tape. Other materials might also be used. In addition, a "Teflon" spray may be applied over the chrome plated area.

The attachment of the skid to the mounting plate therefor, is done by passing the downwardly extending portion 68 of the skid, through the loop of the plate in face to face relationship with the portion 65 thereof (FIG. 10). Then the portion 66 of the loop is bent around the direction of arrow 71 in FIG. 9 and thereby clamped against portion 68 of the skid. The portion 72 of the skid is then bent in the direction of the arrow 73 in FIG. 10 and clamped against portion 66 of the mounting plate after portion 66 has been bent inward from the position shown in FIGS. 9 and 10, to the position shown in FIG. 7. The result is best shown in FIGS. 6 and 7.

As best shown in FIG. 8, the back side of the plate portion 58 of the skid mounting plate has a pair of strips of double faced adhesive thereon at 76. These, together with the magnetic field between the poles of the magnet assembly in the transducer housing, securely retain the plate on the housing so that it cannot move with respect to the housing. Although the housing itself may be of cast aluminum, it will be recalled that the plate is made of a ferromagnetic material so that, employed in the environment of the present invention, it is more securely retained than it might be if made of some other material. However it is conceivable that for other situations, or for some reasons, the mounting plate might be made of a material other than a ferromagnetic material, but in that event certainty must be assured that the double faced adhesive will retain it securely in position, or other means must be employed.

The skid is curvilinear from its leading end portion 54 along its length to the curved end remote from the support arm. As the shim stock is of the same rectangular cross section substantially throughout its length, the skid defines the same curve throughout its width. Thus at any given line across the convex face of the skid, the radius of the curve at all points along the line is the same with respect to an axis parallel to the rotational axis 12. While the radii and axes thereof may vary in amount and location, from line to line along the surface, the axes are all parallel to axis 12. This curve is thus defined by the stock in an infinite number of parallel planes between the sides of the strip and which are parallel to the said mounting plane, and perpendicular to the rotational axis. As suggested above, the cross sectional thickness of the skid itself at any given cross section throughout the length of the skid may be approximately 0.005 inches and its width is normally approximately 0.250 inches. This section has a much lower moment of inertia about a first axis lying in the cross section and passing through its center of gravity and parallel to the rotational axis 12, than it does about a second axis lying in the cross section, and perpendicular to axis 12. Therefore, while the skid has a comparatively high resistance to deflection toward or away from the stylus, it has low resistance to deflection by forces normal to its wide face at any point along the curve thereof.

Because the skid itself is of a very flexible nature, the compliance thereof with variations in paper thickness or platen contour is very satisfactory. The spray coating applied to the area in contact with the paper need not be particularly durable and in fact, if it does wear somewhat it can contribute perfection to the alignment of the skid with respect to the platen and thereby the match of the skid face to the concave face of the paper supported by the platen. The eccentric screw 51 can be adjusted if and as needed to provide the desired spacing of the stylus from the paper with the skid installed, whereupon the screw 76 can be tightened to fix the adjustment. Thereafter, because the skid does slide on the paper, compensation for paper thickness and platen contour variations occurs automatically.

Because of the flexibility of the skid, and the resulting compliance thereof, it does not mark the paper. Because it slides, the skid does not pick up dirt and it protects the follower arm roller from picking up dirt. The curved portion between the area of contact with the paper and the free end of the skid, tolerates some turning of the yoke in a direction opposite its normal rotation (as may occur inadvertently while loading or unloading the machine or otherwise manually working with it). The present invention provides an excellent modification for the existing equipment in terms of ease of installation, minimal cost, and no modification of the equipment other than cutting off enough of the paper press to permit the skid to clearly and freely contact the paper. The remaining portion of the paper press can thereby serve its normal and original intended function during the transmission mode of the equipment, but is not involved at all in the receive mode. An example of a material other than brass for the skid, would be "Mylar."

While the invention has been disclosed and described in some detail in the drawings and foregoing description, they are to be considered as illustrative and not restrictive in character, as other modifications may readily suggest themselves to persons skilled in this art and within the broad scope of the invention.

The invention claimed is:

1. In combination with a transducer assembly including a housing and a stylus mounted to said housing for marking a markable medium traversable by the transducer assembly, stylus control means comprising:

a stylus drive member in said housing and coupled to said stylus and operable to drive said stylus in a direction away from said housing toward said medium;

an arm pivotally mounted to said housing to pivot about a pivot axis, and having connector means extending therefrom to said drive member at a point remote from said pivot axis; and skid means mounted to said housing, said skid means having a skid having a portion immediately adjacent said stylus and slidable on the surface of said medium and coupled to said arm at a point remote from said pivot axis for operation through said arm and connector means to maintain a limit on the position of said stylus with respect to said medium surface, said skid being relatively movable to a limited extent with respect to said arm to adapt to variations in contour of said medium surface.

2. The combination of claim 1 and further comprising:

a markable medium in a holder;

means driving said transducer assembly in a circular path about a rotational axis parallel to said pivot axis, a portion of said path being adjacent said medium;

said skid sliding on said medium surface during movement of said transducer assembly along said portion of said path, the locations of coupling of said skid to said arm, and of sliding contact of said skid with said medium surface, and of said connector means to said stylus drive member, lying in a common plane which is perpendicular to said medium surface and parallel to said pivot axis of said arm.

3. The combination of claim 2 wherein: said skid is curvilinear and has the axes of its curviture parallel to said rotational axis of said path.

4. The combination of claim 3 wherein:

said skid is flexible about said axes.

5. The combination of claim 1 wherein said control means further comprises:

a roller mounted to said arm at a point remote from said pivot axis and urged outwardly toward said medium surface and against said skid whereby said skid is coupled to said arm;

6. The combination of claim 5 and further comprising:

a markable medium;

said skid having a portion immediately adjacent said stylus, and sandwiched between said roller and said medium.

7. In combination with a transducer assembly including a housing and a stylus mounted to said housing for marking a markable medium traversable by the transducer assembly, stylus control means comprising:

a stylus drive member in said housing and coupled to said stylus and operable to drive said stylus in a direction away from said housing toward said medium;

skid means mounted to said housing, said skid means having a portion immediately adjacent said stylus and slidable on the surface of said medium and coupled to said stylus drive member to maintain a limit on the position of said stylus with respect to said medium surface, said transducer assembly including a magnet, and said skid means having a portion in stationary relationship to said housing, said portion being ferromagnetic and retained in said stationary relationship by the attraction of said magnet.

8. In combination with a transducer assembly including a housing and a stylus mounted to said housing for marking a markable medium traversable by the transducer assembly, stylus control means comprising:

a stylus drive member in said housing and coupled to said stylus and operable to drive said stylus in a direction away from said housing toward said medium;

skid means including a mounting portion secured to said housing, an arm extending from said mounting portion, and a skid affixed to said arm, said skid being a curved length of thin material, said skid having a portion immediately adjacent said stylus and slidable on the surface of said medium and coupled to said stylus to maintain a limit on the position of said stylus with respect to said medium surface.

9. The device of claim 8 wherein:

said mounting portion has a surface defining a first mounting plane;

said skid has a uniform cross section throughout a substantial portion of its length.

10. The device of claim 9 wherein:

said skid defines a curve common to a plurality of planes parallel to said mounting plane.

11. The device of claim 10 wherein:

said skid is shim stock and has a cross sectional shape providing a smaller moment of inertia about an axis therein perpendicular to said planes than about axes lying in said planes, for comparatively high resistance to deflection by forces perpendicular to said planes and comparatively low resistance to deflection by forces normal to said curve.

12. The device of claim 8 wherein:

pressure sensitive adhesive means are disposed on said mounting portion.

13. The device of claim 12 wherein:

said mounting portion is a plate of ferromagnetic material.

14. In a transducer assembly, the combination comprising:

a stylus;

a stylus drive member coupled to said stylus;

a support;

a roller adjacent said stylus;

a mounting arm pivotally mounted to said support; said roller being rotatably mounted to said arm, the rotational axes of said roller and said arm being parallel;

cooperating pin and aperture means on said arm and said drive member to control position of said drive member with reference to said roller;

and a skid engageable with medium to be marked by said stylus and engaging said roller to support said roller and thereby said drive member and said stylus with reference to the said medium.

15. The combination of claim 14 wherein:

said skid is a flexible strip having a concave portion engaged with said roller.

* * * * *